United States Patent
Iwami et al.

(10) Patent No.: US 10,602,654 B2
(45) Date of Patent: Mar. 31, 2020

(54) AUTO TRAVELING WORK VEHICLE

(71) Applicant: KUBOTA CORPORATION, Osaka (JP)

(72) Inventors: Kenichi Iwami, Osaka (JP); Shigeki Hayashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/099,892

(22) PCT Filed: May 30, 2016

(86) PCT No.: PCT/JP2016/065918
§ 371 (c)(1),
(2) Date: Nov. 8, 2018

(87) PCT Pub. No.: WO2017/208306
PCT Pub. Date: Dec. 7, 2017

(65) Prior Publication Data
US 2019/0133023 A1    May 9, 2019

(51) Int. Cl.
*A01B 69/04*     (2006.01)
*B60W 10/20*    (2006.01)
(Continued)

(52) U.S. Cl.
CPC ........... *A01B 69/008* (2013.01); *B60W 10/20* (2013.01); *B62D 6/002* (2013.01); *B62D 6/02* (2013.01);
(Continued)

(58) Field of Classification Search
CPC .............. A01B 69/008; G05D 1/0212; G05D 2201/0201; B62D 6/02; B62D 6/002;
(Continued)

(56) References Cited

U.S. PATENT DOCUMENTS 5,350,912 A    9/1994   Ishida
6,304,190 B1 *  10/2001  Blasing ................ G01B 11/024
                                                250/231.18
(Continued)

FOREIGN PATENT DOCUMENTS

JP    S63-153605 A    6/1988
JP    5-197423         8/1993
(Continued)

OTHER PUBLICATIONS

International Search Report in PCT/JP2016/065918, dated Aug. 16, 2016, with English translation.
(Continued)

*Primary Examiner* — Russell Frejd
(74) *Attorney, Agent, or Firm* — Greenblum & Bernstein, P.L.C.

(57) ABSTRACT

An auto traveling work vehicle includes a first control computation section for outputting a first steering value computed for deviation resolution based on a positional deviation between a target traveling path and a self vehicle position, a second control computation section for outputting a second steering value computed for the deviation resolution based on the positional deviation and a directional deviation which is adjusted with using a weight coefficient which provides a progressively decreasing tendency with increase in the positional deviation, a target steering computation section for outputting a target steering value for traveling along the target traveling path based on the first steering value and the second steering value, a steering driving control section configured to input the target steering value and to output a steering driving signal, and a steering driving section for effecting steering of a steerable wheel based on the steering driving signal.

5 Claims, 6 Drawing Sheets

(51) Int. Cl.
  *B62D 6/00* (2006.01)
  *B62D 6/02* (2006.01)
  *G05D 1/02* (2020.01)
(52) U.S. Cl.
  CPC ....... *G05D 1/0212* (2013.01); *B60W 2520/10* (2013.01); *B60W 2710/207* (2013.01); *G05D 2201/0201* (2013.01)
(58) Field of Classification Search
  CPC ........... B60W 10/20; B60W 2710/207; B60W 2520/10
  See application file for complete search history.

(56) References Cited

U.S. PATENT DOCUMENTS

| | | |
|---|---|---|
| 2011/0015850 A1 | 1/2011 | Tange et al. |
| 2013/0304300 A1 | 11/2013 | Peake et al. |
| 2014/0180543 A1 | 6/2014 | Ueda et al. |

FOREIGN PATENT DOCUMENTS

| | | |
|---|---|---|
| JP | H08-054925 A | 2/1996 |
| JP | 2001-350521 | 12/2001 |
| JP | 2002-215239 | 7/2002 |
| JP | 2002-333922 | 11/2002 |
| JP | 2008-131880 | 6/2008 |
| JP | 2008-143293 A | 6/2008 |
| JP | 2008-168782 A | 7/2008 |
| JP | 2009-161100 A | 7/2009 |
| JP | 2009-234560 A | 10/2009 |

OTHER PUBLICATIONS

Office Action from JPO dated Sep. 3, 2019 in JP application No. 2018-191766, and English language translation thereof.
Supplementary European Search Report in EP Application No. 16903934.4 dated Jan. 8, 2020.

* cited by examiner

AUTO TRAVELING WORK VEHICLE

TECHNICAL FIELD

The present invention relates to an auto traveling work vehicle configured to effect autosteered traveling along a set target traveling path.

BACKGROUND ART

As an example of a work vehicle having an autosteering function to be autosteered along a set target traveling path, Patent Literature 1 discloses a rice planter configured to produce a target path parallel with a teaching path produced by a teaching path producing means based on position information determined by a GPS (Global Positioning System) unit and to be caused to travel autonomously on the target path.

With this rice planter, an actual traveling path in the course of an auto traveling is determined by the GPS unit and a deviation amount between the target path and the actual traveling target path is computed for comparison with a preset threshold value. In this, an angle formed between the target path direction and the advancing direction is used as such deviation amount. And, if this deviation amount exceeds the threshold value, then, the direction of this deviation relative to a reference line is determined. If the deviation direction is deviation to the left side, a steering device will be corrected to the right direction in correspondence with the amount of this deviation. If the deviation direction is deviation to the right side, the steering device will be corrected to the left direction in correspondence with the amount of this deviation.

However, with a work vehicle implementing such principle of auto traveling function, only an angle formed between the target path direction and the advancing direction is used as traveling deviation for steering control, appropriate traveling becomes difficult in case only the amount of deviation is large, although the target path; and in case the vehicle body are located in vicinity or the amount of deviation is small, although the target path and the vehicle body are located far apart from each other.

According to a traveling control technique for a vehicle system disclosed in Patent Literature 2, for a target traveling path (a target track) including a variety of curvatures in a mixed state, a lateral deviation amount from a target traveling path, a deviation amount of direction therefrom and a curvature of the target traveling path are determined and a steering angle corresponding to the two deviation amounts and the curvature will be calculated and outputted.

Specifically, a reference point is provided such that a vehicle position may be located in a normal line direction of the target traveling path. For this coordinate system, the coordinate system is converted from an absolute coordinate system of the vehicle position into a relative coordinate system relative to the reference point. Also, deviation amounts of the relative lateral displacement and the direction angle from the target traveling path are calculated; and a steering angle is obtained under the proportional control technique, based on a feedback-like operational amount corresponding to the deviation amounts and a feedforward-like operational amount corresponding to the curvature of the target lane and the lateral displacement amount.

However, although this traveling control technique may be effective for e.g. an automobile which travels on a paved road, in the case of an agricultural work machine such as a rice planter, a tractor, a combine or a lawn mower, etc. or a civil engineering work machine such as a dozer, since the traveling speed of such machine or vehicle is low, for a same steering angle, it takes a long time for traveling deviation to be resolved as compared with a vehicle which travels at a high speed. Moreover, a momentary positional displacement from a target position may occur due to slippage or riding on an earth lump. Therefore, the traveling control technique disclosed in Patent Literature 2 cannot be applied as it is to an autosteered traveling of a work vehicle.

PRIOR ART DOCUMENTS

Patent Literatures

Patent Literature 1: Japanese Unexamined Patent Application Publication No. 2008-131880 (JP 2008-131880 A)
Patent Literature 2: Japanese Unexamined Patent Application Publication No. 2002-215239 (JP 2002-215239 A)

SUMMARY OF THE INVENTION

Object to be Achieved by the Invention

In view of the above-described state of the art, an object of the present invention is to provide an auto traveling work vehicle which may effect the autosteered traveling along a set target traveling path with a high accuracy even during work traveling.

Solution to Achieve the Object

An auto traveling work vehicle configured to effect autosteered traveling along a set target traveling path, comprising:
a self vehicle position calculation section for calculating a self vehicle position;
a self vehicle direction calculation section for calculating a traveling direction of the self vehicle;
a positional deviation computation section for computing a positional deviation of the self vehicle position relative to the target traveling path;
a directional deviation computation section for computing a directional deviation between a directional line of the target traveling path and the traveling direction;
a first control computation section for outputting a first steering value computed for deviation resolution based on the positional deviation;
a second control computation section for outputting a second steering value computed for the deviation resolution, based on the positional deviation and the directional deviation which is adjusted with using a weight coefficient which provides a progressively decreasing tendency with increase in the positional deviation;
a target steering computation section for outputting a target steering value for traveling along the target traveling path based on the first steering value and the second steering value;
a steering driving control section configured to input the target steering value and to output a steering driving signal; and
a steering driving section for effecting steering of a steerable wheel based on the steering driving signal.

With the above-described arrangement, a target steering value for traveling along the target traveling path is outputted from a positional deviation relative to the target traveling path and a direction deviation relative to the target traveling path. However, the arrangement does not simply obtain the first steering angle computed for deviation resolution from the positional deviation relative to the target traveling path and the second steering value computed for deviation resolution from the directional deviation relative to the target traveling path, but takes the positional deviation relative to the target traveling path additionally into consideration in the computation of the second steering value. More particularly, the arrangement introduces a weighting function for deriving a weight coefficient using the positional deviation as a variable, and configures this weighting function such that the weight coefficient tends to decrease progressively with increase in the positional deviation. Namely, suppose the positional deviation is represented by "d" and the weighting function is represented by "G", then the weight coefficient: w is obtained as: G (d). And, the function: G is a function which exhibits monotonous or stepwise decrease. Normally, w becomes a numerical value which is greater than 0 and equal to or less than 1. Such weight coefficient: w is used in a multiplication.

With this, the second steering value for deviation resolution will be outputted based on the positional deviation and the directional deviation, under the condition that if the positional deviation is large, the weight for this positional deviation will be decreased. Then, based on the first steering value and the second steering value obtained as above, a final target steering value for traveling along the target traveling path will be outputted. With the above arrangement, in case the positional deviation is large, the target steering value which places priority on resolution of this positional deviation will be outputted, with disregarding (or "ignoring") the directional deviation to a certain extent. Therefore, If a large positional deviation (positional displacement) occurs due to slippage or riding over an earth lump, etc., this positional deviation can be resolved in a speedy manner. This is advantageous for a work vehicle such as a rice planter, a combine, a tractor, a lawn mower, etc. which needs to avoid significant deviation from a linear traveling path as much as possible, even at the cost of giving up traveling simply straight.

Incidentally, in this disclosure, with assumption of a target traveling path being linear, a positional deviation is defined as a length of a perpendicular line drawn from a vehicle body to the target traveling path; and a directional deviation is defined as a value which can be represented by an angle formed between a traveling directional line of the vehicle body and the target traveling path.

In the case of a control system configured to output a target steering value for appropriate deviation resolution in a low-speed or middle-speed traveling, if the steering angle remains the same, the higher the vehicle speed, the greater the positional or direction change of the vehicle body occurring in a fixed time period. As a result, there occurs a problem of the vehicle body tending to meander during high-speed traveling. For solving this problem, according to one preferred embodiment of the present invention: the auto traveling work vehicle further comprises a vehicle speed calculation section for calculating a vehicle speed; wherein, when the target steering computation section outputs the target steering value based on the first steering value and the second steering value, the target steering computation section is configured to decrease the target steering value if the vehicle speed is high, with using an adjustment coefficient providing a progressively decreasing tendency with increase in the vehicle speed. Specifically, the above arrangement introduces an adjustment function for deriving an adjustment coefficient (e.g. a numeric value greater than 0 and equal to or smaller than 1) using the vehicle speed as a variable; and configures this adjustment function such that the adjustment coefficient tends to decrease progressively with increase in the vehicle speed. Namely, suppose the vehicle speed is represented by "s" and the adjustment function is represented by "K", then, the adjustment coefficient: k is obtained as: K(k). And, the function: K is a function which exhibits monotonous or stepwise decrease. Such adjustment coefficient: k is used in a multiplication. With the above arrangement, the target steering value will be decreased if the vehicle speed becomes high. Whereby, appropriate deviation resolution from low speed traveling to high speed traveling will be realized, so that the autosteered traveling will become stable.

As another measure to cope with the problem that the higher the vehicle speed, the greater the influence the steering angle for deviation resolution to the vehicle body, according to one preferred embodiment of the present invention: the target steering computation section has an upper limiter function for the target steering value, with an upper limit value being set according to the vehicle speed. Preferably, the upper limit value is variable according to a type of work. With this, appropriate deviation resolution from low speed traveling to high speed traveling will be realized, so that the autosteered traveling will become stable.

As described above, according to one aspect of the present invention, in case positional deviation is large, a target steering value will be outputted with placing priority on resolution of the positional deviation, and with disregarding directional deviation to a certain extent. In this, if the degree of disregarding positional deviation is changed according to a situation of the soil on which work traveling is effected or a type of utility work, this will provide higher possibility of obtaining autosteered traveling more suited to the work. For this reason, according to one preferred embodiment of the present invention: degree of weight decrease by the second control computation section, using the weight coefficient for the directional deviation dependent on the amount of the positional deviation, is variable.

For the sake of simplification of the target steering computation section for outputting a target steering value for traveling along the target traveling path based on the first steering value and the second steering value, according to one preferred embodiment of the present invention: the target steering computation section is configured to output the target steering value by adding up the first steering value and the second steering value. With this, by executing control for causing the vehicle body to progressively approach the target traveling path while executing control for causing a traveling direction of the vehicle body to be aligned with a line parallel with the target traveling path, it is possible to carry out a work traveling along a linear target traveling path which is required especially for a field work or the like.

EMBODIMENTS FOR CARRYING OUT THE INVENTION

Figure 1:
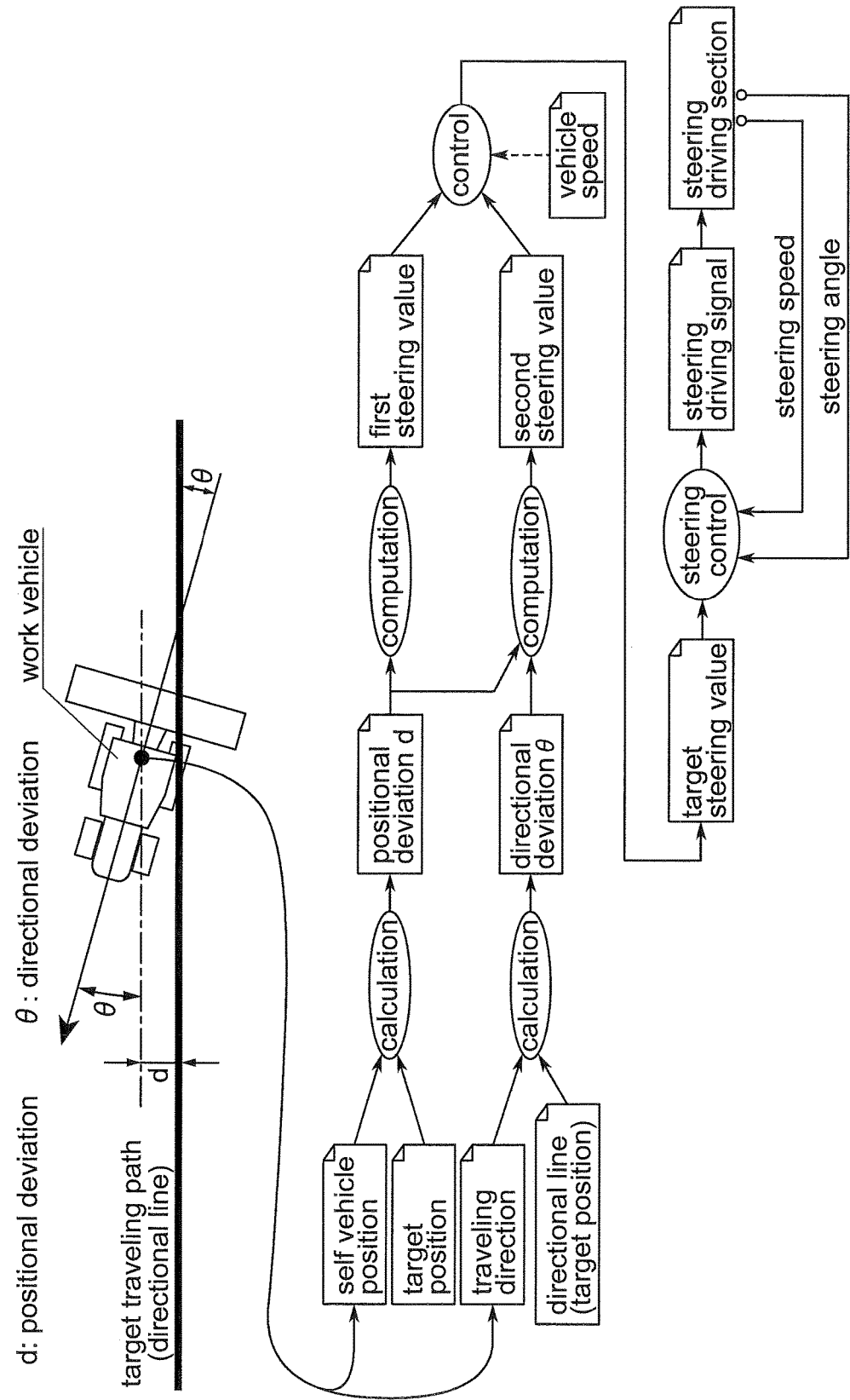
FIG. 1 is a schematic for describing a basic principle of autosteered traveling control according to the present invention.

Before describing a specific embodiment of an auto traveling work vehicle relating to the present invention, a basic principle of autosteered traveling control according to the present invention will be described with reference to FIG. 1. Here, as such auto travelling work vehicle, there is assumed an agricultural work machine or vehicle such as a rice planter, a tractor, a combine, etc. which effects straight work traveling in a field by performing U-turns in repetition. The work vehicle is configured to effect autosteered traveling along a preset target traveling path. For effecting such autosteering, it is necessary to know a current position of the work vehicle (to be referred to as "self vehicle position" hereinafter) and a current traveling direction thereof (to be referred to as "self vehicle direction" hereinafter). To this end, this work vehicle is equipped with a satellite navigation device using a satellite called GPS (Global Positioning System) or GNSS (Global Navigation Satellite System), and an inertial navigation device using an accelerometer or a gyro. As shown in FIG. 1, here, the self vehicle position is represented by measurement values (latitude, longitude) about the work vehicle, and the self vehicle direction is represented by a traveling direction which is calculated from a change in position of the self vehicle occurring per unit time period.

As shown in FIG. 1, a distance: d is treated as a "positional deviation" which is defined between a straight line drawn from a work vehicle center in parallel with a straight target traveling path (directional line) and the target traveling path. And, an angle: $\theta$ is treated as a "directional deviation" which is formed between a vehicle body front/rear direction line extending through the vehicle body center (traveling direction) and the target traveling path. The self vehicle position used as a target in the autosteering travel control is a point located on the target traveling path, and the self vehicle direction used as the target is the direction of the target traveling path. Therefore, the positional deviation of the self position relative to the target traveling path will be "d", and the directional deviation of the traveling direction relative to the directional line of the target traveling path will be "$\theta$".

Based on the positional deviation, a first steering value for resolving deviation is computed. For this computation, PID (Proportional-Integral-Differential) control computation can be advantageously employed. Based on the directional deviation, a second steering value for resolving deviation is computed. In this computation, the positional deviation will also be taken into consideration. If the positional deviation is large, the weight of the directional deviation for the second steering value will be decreased. For instance, there is produced a function: W(d) for deriving a weight coefficient: w (0<w<1) which provides a progressively decreasing value in response to increase in the position deviation for a value obtained by a function: F($\theta$) for deriving the second steering value. And, the second steering value is obtained by: W(d)×F($\theta$). Namely, in the case of large positional deviation, with decrease of the weight of the directional deviation, the second steering value for deviation resolution will be outputted based on the positional deviation and the directional deviation. Incidentally, it is preferred that the PID control computation be employed also in deriving the second steering value based on the directional deviation.

Then, by using the first steering value and the second steering value thus obtained as inputs, a target steering value for the work vehicle to travel along the target traveling path is obtained and outputted. Most simply, such target steering value can be obtained by an arithmetic addition operation taking signs of the first steering value and the second steering value into consideration. Further, there is provided a steering control system configured to input this target steering value and then to output a steering driving signal to a steering driving section for driving a steering angle of a steerable wheel (including a crawler also) of the work vehicle. Such steering driving section can be constituted of an electric motor and/or a hydraulic device. Preferably, the steering control system is constituted of a PI (Proportional-Integral) feedback control technique, but can employ any other control technique as well. Here, as feedbacks, a steering speed and a steering angle are employed.

Incidentally, as shown by a dotted line in FIG. 1, when the target steering value is to be obtained from the first steering value and the second steering value, a traveling speed of the work vehicle, namely, a vehicle speed, may be preferably taken into consideration as well. Namely, for a same steering angle, the higher the vehicle speed, the larger the posture change amount of the vehicle body occurring per unit time period. If this posture change amount per unit time period is too large, this will cause inconvenience of "roughing up" the field. For this reason, the target steering value, obtained from the first steering value and the second steering value, should be preferably decreased progressively with increase in the vehicle speed. For instance, at time of low speed traveling, the computed target steering value can be used as it is; whereas, at time of high speed traveling higher than a set speed, the target steering value can be decreased by a predetermined decrease ratio.

Next, one specific embodiment of the auto traveling work vehicle relating to the present invention will be described.

Figure 2:
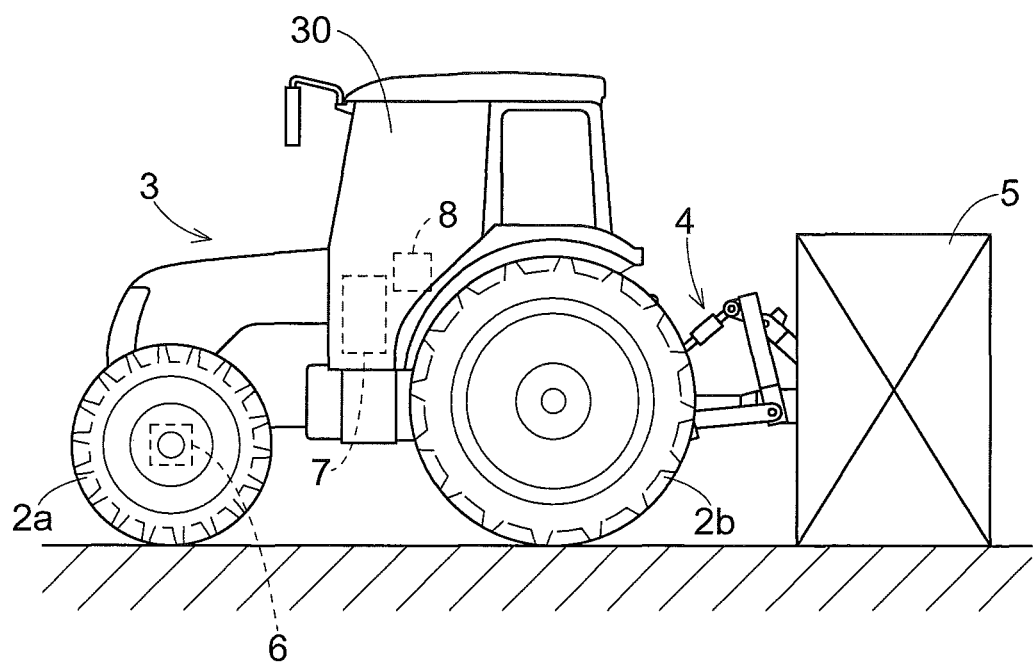
FIG. 2 is a side view showing a tractor as one embodiment of an auto traveling work vehicle relating to the present invention.

As shown in FIG. 2, in the instant embodiment, the work vehicle is configured as a tractor mounting a utility implement for carrying out an agricultural work such as a cultivating work on a field delimited by a ridge. In this tractor, a maneuvering section 30 is formed at the center portion of a vehicle body 3 supported by front wheels 2a and rear wheels 2b. At a rear portion of the vehicle body 3, a ground work implement 5 is mounted via a hydraulic lift mechanism 4. The front wheels 2a function as "steerable wheels". By changing a steering angle thereof, a traveling direction of the tractor is changed. The steering angle of the front wheels 2a is changed by an action of a steering mechanism 6. The steering mechanism 6 includes a steering driving section 60 for autosteering (to be described later, see FIG. 3). Controlling of an electric motor constituting the steering driving section 60 is effected via a steering driving signal from an electronic control unit 7 (to be described later, see FIG. 3 and FIG. 4). Incidentally, the steering angle of the front wheels 2a can be changed also by an operation on a steering wheel as done conventionally. This steering wheel is disposed at the maneuvering section 30 of the tractor together with various control levers and a seat at which a driver is to be seated. At the maneuvering section 30, there is also disposed a positioning unit 8 for determining a self vehicle position which is required at time of autosteering. This positioning unit 8 includes a satellite navigation module constituted as a GNSS module, as well as an inertial navigation module configured as a gyro module incorporating a gyro acceleration sensor or a compass sensor. The satellite navigation module includes a satellite antenna for receiving a GPS signal or a GNSS signal. But, illustration thereof is omitted in FIG. 2.

Figure 3:
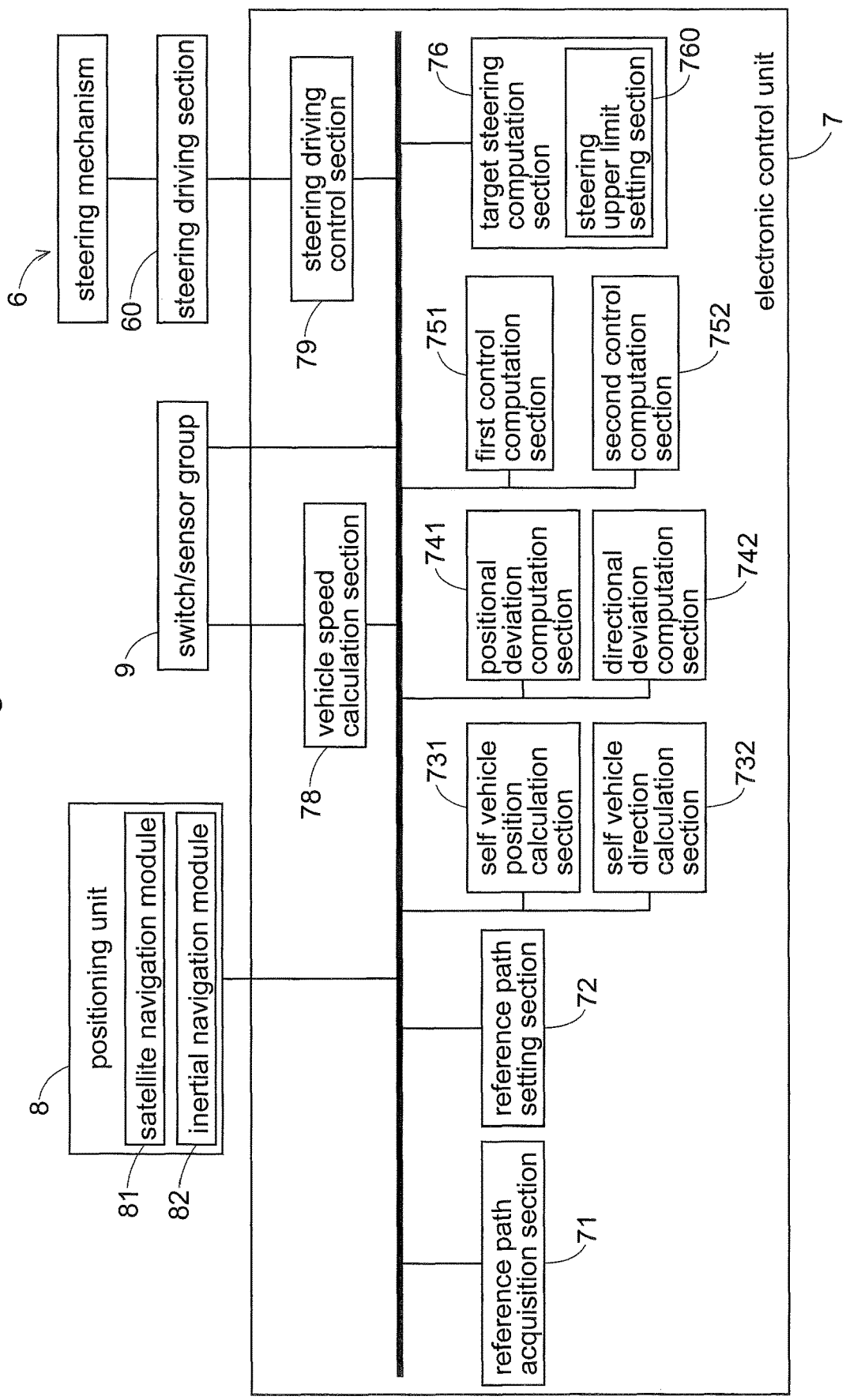
FIG. 3 is a functional block diagram showing a control system mounted in the tractor.

FIG. 3 shows a control system mounted on this work vehicle. This control system employs the basic principle of autosteering control described above with reference to FIG. 1. The control system shown in FIG. 3 includes the electronic control unit 7, the positioning unit 8, a switch/sensor group 9, and the steering driving section 60.

The positioning unit 8 includes the satellite navigation module 81 for detecting compass directions such as latitude and longitude with using the GNSS, and its configuration is similar to that of a positioning unit for use in a car navigation system. The positioning unit 8 further includes the inertial navigation module 82 including e.g. a gyro acceleration sensor, for detecting an instantaneous movement of the work vehicle (directional vector or the like) and its direction, in supplementation to the satellite navigation module 81. The steering driving section 60 adjusts the steering angle of the front wheels 2a acting as steerable wheels, based on a steering driving signal outputted from the electronic control unit 7. The switch/sensor group 9 comprises a generic reference to sensors and/or switches for detecting a traveling state and setting situation of the work vehicle. Detection signals therefrom will be inputted to the electronic control unit 7 to be used as input parameters for various kinds of control. The switch/sensor group 9 includes also a sensor for outputting a detection signal for calculation of a vehicle speed, and a sensor for outputting a detection signal for calculation of a driving state of the steering driving section 60 (e.g. an operational speed and a steering angle).

The electronic control unit 7 includes, as functional sections relating especially to the present invention, a reference path acquisition section 71, a reference path setting section 72, a self vehicle position calculation section 731, a self vehicle direction calculation section 732, a positional deviation computation section 741, a directional deviation computation section 742, a first control computation section 751, a second control computation section 752, a target steering computation section 76, a vehicle speed calculation section 78 and a steering driving control section 79.

The reference path acquisition section 71 acquires the target traveling path for autosteered work traveling, based on field information such as a map position of the field as the subject of work, position data of the ridge delimiting the borderline of this field, and work information relating to the work to be carried out in the field, such as device setting data (e.g. a working width). For acquisition of the target traveling path, it is possible to employ downloading from a management server installed at a remote site, reading from target traveling paths stored in the work vehicle per se according to fields and types of work, etc. Alternatively, the target traveling path may be obtained by a computation on each occasion, with using an algorithm for target traveling path calculation. Further alternatively, the target traveling path may be calculated via teaching traveling also.

Upon decision of the target traveling path, the reference path setting section 72 will incorporate this target traveling path into its map for work traveling and execute processing thereof so that the target traveling path may be utilized as a control target for autosteering traveling.

The self vehicle position calculation section 731 calculates a self vehicle position in the work traveling map based on positioning data transmitted from the positioning unit 8. The self vehicle direction calculation section 732 calculates a traveling direction of the self vehicle in the work traveling map based on the positioning data transmitted from the positioning unit 8. The positional deviation computation section 741 computes a positional deviation (denoted by a sign: d in FIG. 1) between the target traveling path and the self vehicle position. The directional deviation computation section 742 computes a directional deviation (denoted by a sign: θ in FIG. 1) between a directional line of the target traveling path and the traveling direction.

The first control computation section 751 outputs a first steering value computed for deviation resolution based on the positional deviation. The second control computation section 752 outputs a second steering value computed for deviation resolution based on the positional deviation and the directional deviation, with decrease of the weight of the directional deviation using the above-described weight coefficient in case the positional deviation is large. Alternatively, the second control computation section 752 may be configured to output a temporary second steering value for deviation resolution based on the directional deviation and to decrease this temporary second steering value progressively with increase in the positional deviation, and then to output the result as the final second steering value. Incidentally, the degree of decrease of the directional deviation depending on the magnitude of the positional deviation is adjustable or variable via an input device.

The target steering computation section 76 outputs a target steering value for the work vehicle to travel along the target traveling path, based on the first steering value and the second steering value. In a simplest configuration, a result of an arithmetic addition computation of the first steering value and the second steering value becomes the target steering value. At the steering driving control section 79, the target steering value outputted from the target steering computation section 76 will be used as an input parameter for control computation for outputting the steering driving signal for driving the steering driving section 60.

In the instant embodiment, when the target steering value is computed, the target steering computation section 76 functions to take into consideration the vehicle speed of the work vehicle obtained from the vehicle speed calculation section 78, such that when the vehicle speed is high, the target steering computation section 76 will decrease the target steering value which is outputted based on the first steering value and the second steering value. More particularly, when the target steering value is to be outputted based on the first steering value and the second steering value, the target steering computation section 76 will decrease the target steering value in the case of high vehicle speed, with using an adjustment coefficient: k which provides a progressively decreasing tendency with increase in the vehicle speed.

Moreover, the target steering computation section 76 incorporates a steering upper limit setting section 760. This steering upper limit setting section 760 has a function of "clamping" an upper limit for a target steering value obtained with using the first steering value and the second steering value and also the vehicle speed when appropriate, namely, an upper limiter function. Preferably, this upper limit value too should be made variable according to the vehicle speed. Namely, a maximum target steering value may be progressively decreased in correspondence with increase in the vehicle speed, and then the steering stability will be improved at time of high speed traveling.

With reference to a control diagram shown in FIG. 4 next, the specific controlling configuration of the electronic control unit 7 constructed as above will be described. Under the PI control, the first control computation section 751 computes and outputs the first steering value for reducing the positional deviation: d, with using a target positional deviation: Δd and the positional deviation: d as input parameters. In this, the PID control may be employed instead of the PI control. The second control computation section 752 computes and outputs, by using the PI control, the second steering value for reducing the directional deviation: θ with using a target directional deviation: Δθ and the directional deviation: θ as input parameters. In this, the PID control may be employed instead of the PI control. If the positional deviation is large, however, the second control computation section 752 may decrease a temporary second steering value obtained based on the directional deviation, linearly or non-linearly according to the positional deviation amount, and then output the result thereof. The target steering computation section 76 controls and outputs, as a target steering value, an addition value of the first steering value outputted from the first control computation section 751 and the second steering value outputted from the second control computation section 752.

The steering driving control section 79 is configured as a feedback type steering control module. In this, by inputting a steering angle commanding value: Sθ* obtained by comparison computation between the inputted target steering value and an actual steering angle: Sθ, a front stage output value will be obtained with using the PI control. This front stage output value will be subjected to comparison computation with an actual steering speed: Sω outputted from a speed computing unit: du/dt using differentiation. Then, under the PI control with using the result of the computation (steering speed commanding value: Sω') as an input, a steering driving signal will be outputted. The steering driving signal will drive, via a driver, the motor in the steering driving section 60, to thereby steer the front wheels 2a.

Incidentally, the PI control used in the steering driving control section 79 may be replaced by the PID control.

[Variation 1 of Autosteering Control System]

Figure 4:
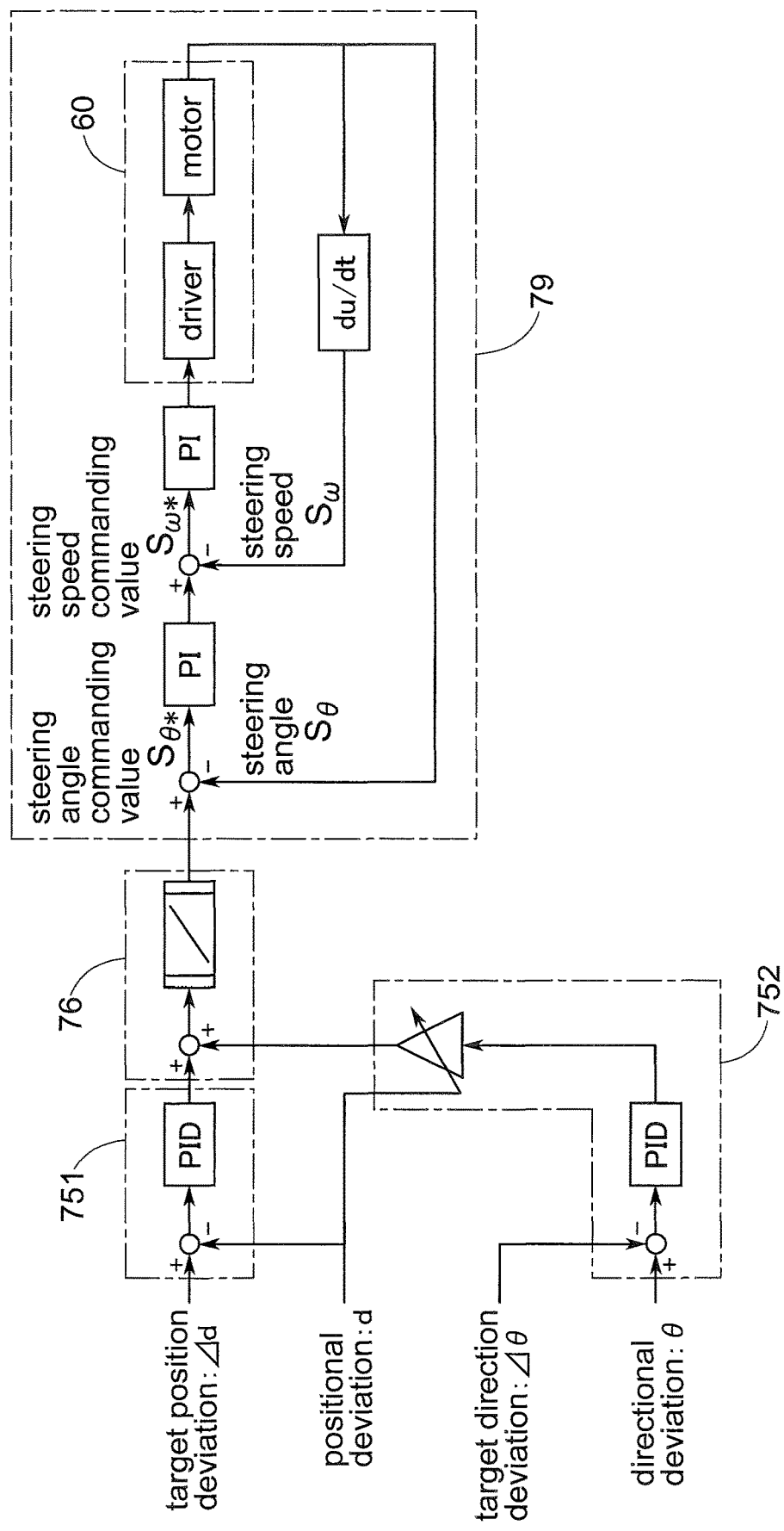
FIG. 4 is a control system diagram showing an autosteering control system.
Figure 5:
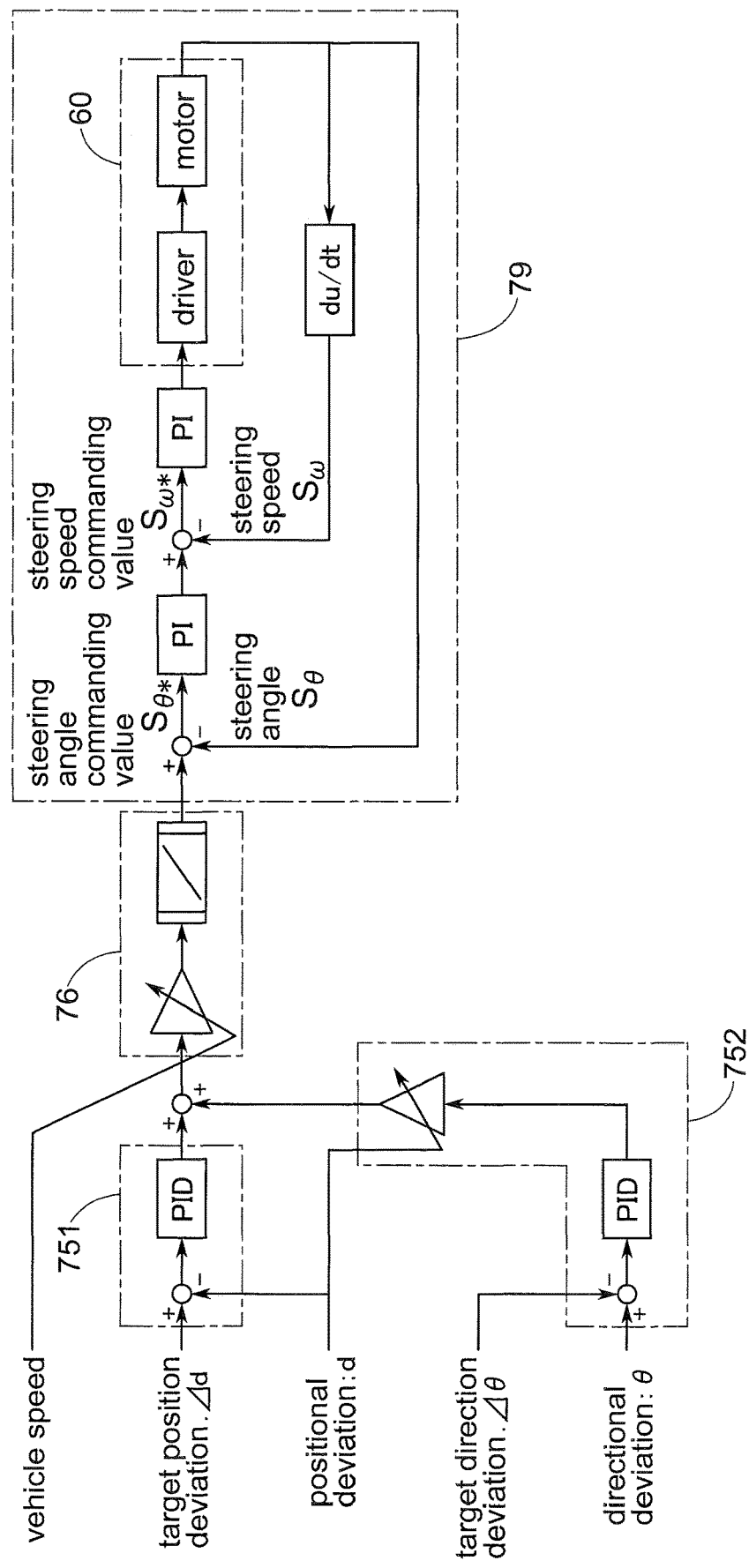
FIG. 5 is a control system diagram showing a further autosteering control system.

FIG. 5 shows a variation of the control diagram of the electronic control unit 7 shown in FIG. 4. The control diagram shown in FIG. 5 differs from FIG. 4 in that the target steering computation section 76 is added with a function of reducing the finally outputted target steering value according to the vehicle speed.

Namely, in this variation, there is added a computation function of progressively reducing the addition value of the first steering value outputted from the first control computation section 751 and the second steering value outputted from the second control computation section 752, with increase in the vehicle speed.

[Variation 2 of Autosteering Control System]

Figure 6:
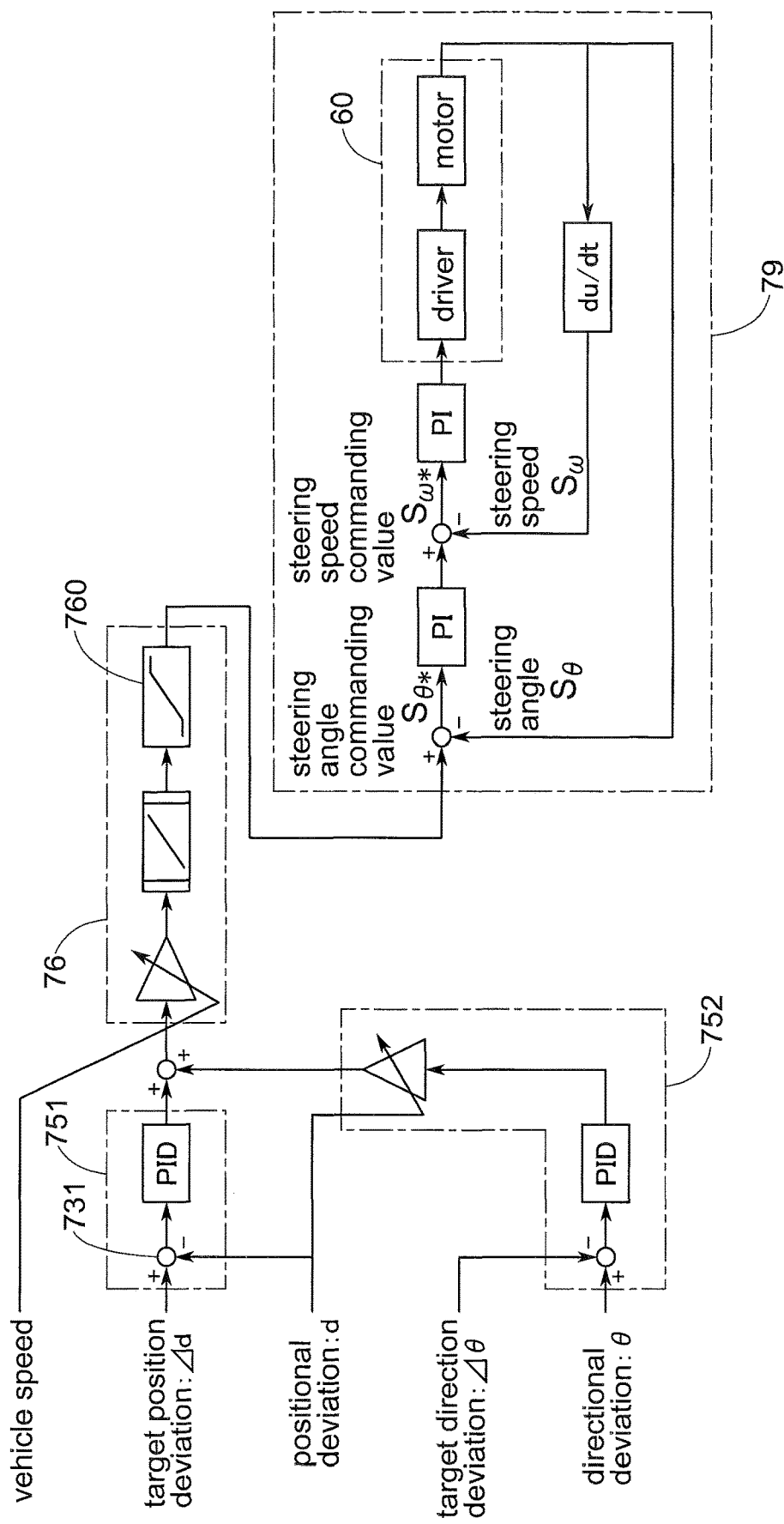
FIG. 6 is a control system diagram showing a still further autosteering control system.

FIG. 6 shows a variation of the control diagram of the electronic control unit 7 shown in FIG. 5. The control diagram shown in FIG. 6 differs from FIG. 5 in that the target steering computation section 76 incorporates the steering upper limit setting section 760 and there is added a function of clamping the upper limit of the finally outputted target steering value.

Namely, in this variation, prior to outputting of an obtained target steering value, a maximum target steering value to be outputted is suppressed by a threshold value which varies according to the vehicle speed, such that the higher the vehicle speed, the smaller the maximum target steering value outputted.

Other Embodiments (1) In the foregoing embodiment, the steering driving control section 79 was configured as a steering control module using an actual steering angle and steering speed as feedback amounts. However, in the present invention, the controlling configuration of the steering driving control section 79 is not particularly limited, but any other known controlling configuration may be employed also.

(2) In the foregoing embodiment, the target traveling path was assumed to be a linear or straight path. However, the present invention is applicable also to an arrangement of the target traveling path being a curved path.

(3) In the foregoing embodiment, the positioning unit 8 was constituted of the satellite navigation module 81 and the inertial navigation module 82. Instead, the unit 8 may include the satellite navigation module 81 alone.

(4) In the foregoing embodiment, a tractor was disclosed as an example of the auto traveling work vehicle. However, the work vehicle is not limited thereto. The auto traveling work vehicle may be any other agricultural work vehicle, such as a rice planter, a combine, etc. that mounts various implements and that is capable of autosteered traveling. Further, the present invention is applicable not only to agricultural work vehicles, but to other work vehicles.

DESCRIPTION OF REFERENCE MARKS/NUMERALS

60: steering driving section
76: target steering computation section
78: vehicle speed calculation section
79: steering driving control section
731: self vehicle position calculation section
732: self vehicle direction calculation section
741: positional deviation computation section
742: directional deviation computation section
751: first control computation section
752: second control computation section

What is claimed is:

1. An auto traveling work vehicle configured to effect autosteered traveling along a set target traveling path, comprising:
   a self vehicle position calculation section for calculating a self vehicle position;
   a self vehicle direction calculation section for calculating a traveling direction of the self vehicle;
   a positional deviation computation section for computing a positional deviation of the self vehicle position relative to the target traveling path;
   a directional deviation computation section for computing a directional deviation between a directional line of the target traveling path and the traveling direction;
   a first control computation section for outputting a first steering value computed for deviation resolution based on the positional deviation;
   a second control computation section for outputting a second steering value computed for the deviation resolution, based on the positional deviation and the directional deviation which is adjusted with using a weight coefficient which provides a progressively decreasing tendency with increase in the positional deviation;
   a target steering computation section for outputting a target steering value for traveling along the target traveling path based on the first steering value and the second steering value;
   a steering driving control section configured to input the target steering value and to output a steering driving signal; and
   a steering driving section for effecting steering of a steerable wheel based on the steering driving signal.

2. The auto traveling work vehicle of claim 1, further comprising:
- a vehicle speed calculation section for calculating a vehicle speed;
- wherein, when the target steering computation section outputs the target steering value based on the first steering value and the second steering value, the target steering computation section is configured to decrease the target steering value if the vehicle speed is high, with using an adjustment coefficient providing a progressively decreasing tendency with increase in the vehicle speed.

3. The auto traveling work vehicle of claim 1, further comprising:
- a vehicle speed calculation section for calculating a vehicle speed;
- wherein the target steering computation section has an upper limiter function for the target steering value, with an upper limit value being set according to the vehicle speed.

4. The auto traveling work vehicle of claim 1,
wherein degree of weight decrease by the second control computation section, using the weight coefficient for the directional deviation dependent on the amount of the positional deviation, is variable.

5. The auto traveling work vehicle of claim 1,
wherein the target steering computation section is configured to output the target steering value by adding up the first steering value and the second steering value.

* * * * *